United States Patent
Reznar

(10) Patent No.: US 6,991,417 B2
(45) Date of Patent: Jan. 31, 2006

(54) SPARE TIRE HANDLING DEVICE WITH A WHEEL RETAINER

(75) Inventor: Jason Reznar, Redford, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 87 days.

(21) Appl. No.: 10/601,920

(22) Filed: Jun. 18, 2003

(65) Prior Publication Data

US 2004/0265102 A1 Dec. 30, 2004

(51) Int. Cl.
*B66D 1/00* (2006.01)

(52) U.S. Cl. .................... 414/463; 254/323

(58) Field of Classification Search ............... 254/323; 414/463, 466
See application file for complete search history.

(56) References Cited

U.S. PATENT DOCUMENTS

| | | | |
|---|---|---|---|
| 3,390,864 A * | 7/1968 | Searcy et al. ............... | 254/264 |
| 6,427,981 B1 * | 8/2002 | Kingsbury et al. ......... | 254/323 |
| 6,435,479 B1 * | 8/2002 | Raz et al. .................. | 254/323 |
| 6,692,216 B2 * | 2/2004 | Reznar et al. .............. | 414/463 |

* cited by examiner

*Primary Examiner*—James W. Keenan
(74) *Attorney, Agent, or Firm*—Casmir Kiczek; Dean B. Watson; Kevin Mackenzie

(57) ABSTRACT

A spare tire handling device mounted on a vehicle and adapted for moving a spare tire between a stored and an accessible position relative to the vehicle, and including a winch and a flexible member attached to the winch at one end and the other end to the spare tire. The device includes a tire carrier with a housing and one extending portion pivotally connected to the housing. The extending portion being movable from a retracted to an extended position. Additionally a biasing member urges the extending portion to an extended position. A secondary lock assembly and a rim spacer are also disclosed.

8 Claims, 10 Drawing Sheets

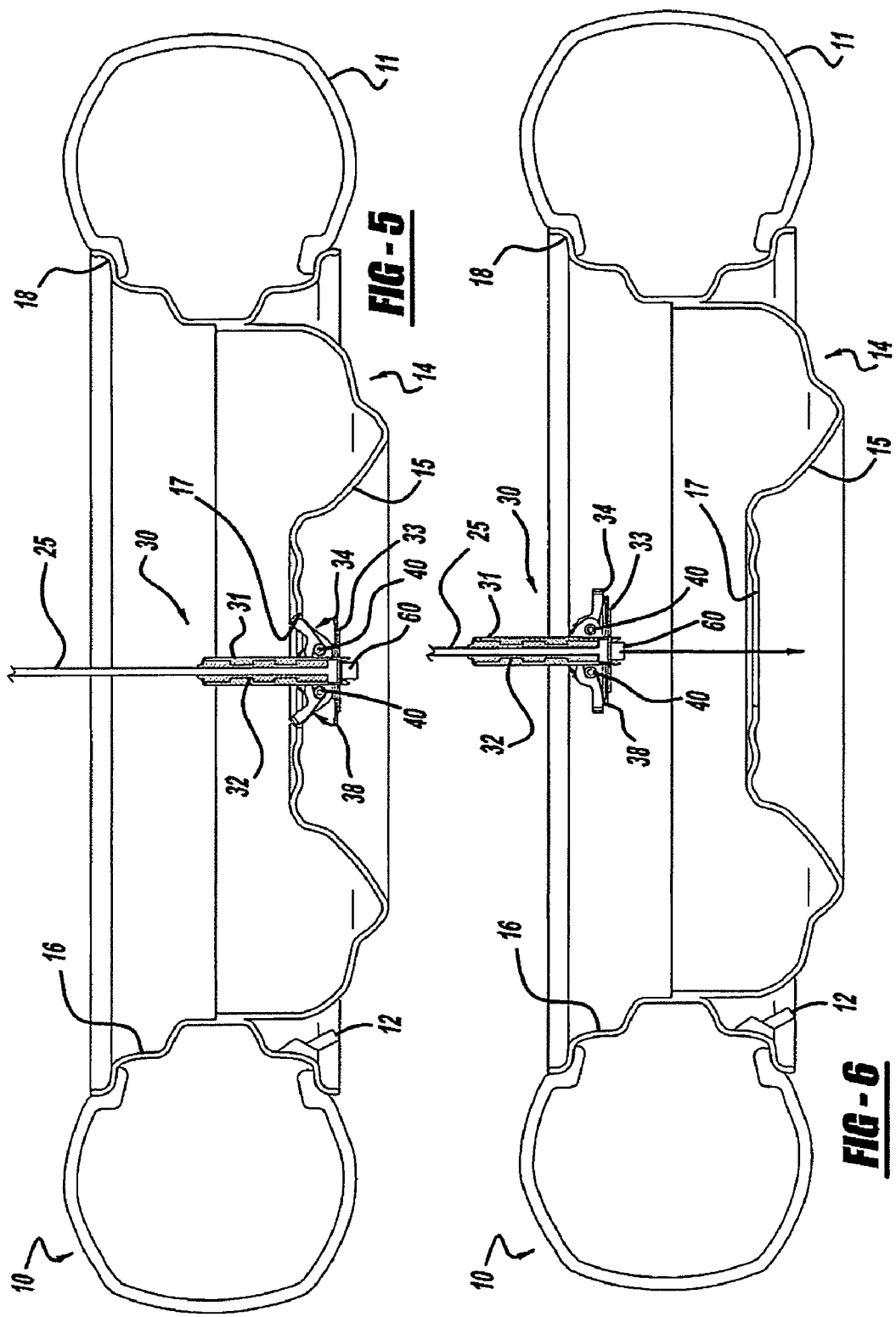

SPARE TIRE HANDLING DEVICE WITH A WHEEL RETAINER

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a spare tire handling device for a vehicle and, more particularly, to a tire carrier for a vehicle with a retractable wheel retainer.

BACKGROUND OF THE INVENTION

Spare tire handling devices with one-piece wheel retainers for vehicles are well known in the prior art, and they are widely used because of their simple design. See for example, U.S. Pat. Nos. 4,600,352; 4,693,453; 5,060,912; 5,297,913; 6,092,790; 6,267,546; and 6,427,981. When a user uses such one-piece wheel retainer with a winch and cable, the user is required to maneuver the retainer with it attached to the cable at an angle through a central hole in the tire rim to engage the under side surface of the rim prior to the tire being moved from the accessible position to a stored position.

This arrangement has not been found to be satisfactory in all cases as the user must manipulate the wheel retainer under all climatic conditions, in traffic and must exercise care to attach and store the correct size spare tire in the vehicle in event that the spare tire is required to replace a damaged running tire at a later time. Additionally, the user must place the tire with the "beauty side" surface oriented properly with respect to the vehicle prior to being moved to the stored position by the tire carrier so as store the tire properly in the allocated space in the vehicle. None of the prior art designs solve these problems.

One attempt to solve this problem is shown in U.S. Pat. No. 3,390,864 to E. L. Searcy et al. Searcy discloses a spare tire handling device with a retractable wheel retainer with a gripping mechanism that utilizes pivotally mounted arms with notches that engage the edge of the tire rim about the wheel opening. The notches in the arms are maintained in contact with the tire rim by action of coil springs acting between a housing and the arms to urge the arms away from the housing. This arrangement is not satisfactory as the coil springs can fail, disengage or become inoperative and thus permitting the arms to disengage from the tire rim that can result in the loss of the spare tire. This prior art design does not disclose or suggest the present invention.

SUMMARY OF THE INVENTION

The present invention provides a spare tire handling device which overcomes at least some of the above-noted problems of the related art. According to the present invention, a spare tire handling device is mounted on a vehicle and adapted for moving a spare tire between a stored and accessible position relative to the vehicle. The vehicle includes a winch member and a flexible member attached at one end to the winch member and the other end detachably engageable with the spare tire whereby the tire is displaceable from the accessible to the stored position in response to the operation of the winch member in one direction and from the stored to the accessible position in response to the operation of the winch in the direction opposite to the one direction. The device comprises, in combination, a tire carrier having a housing and at least one extending portion pivotally connected to the housing. The extending portion is movable from a retracted position to an extended position. Additionally, a biasing member biases the extending portion toward the extended position.

The present invention also provides, a method for handling a spare tire that overcomes at least some of the above mentioned problems of the related art. The method of handling a spare tire with a rim for a vehicle comprises providing a winch member. Placing a flexible member adjacent the winch. The flexible member has one end attached to the winch member and the other end detachably engageable with the tire. The tire is displaceable from an accessible position to a stored position in response to the rotation of the winch in one direction and from the stored position to the accessible position in response to the rotation of the winch in the opposite direction. Positioning a wheel retainer adjacent to the other end of the flexible member. The retainer has a housing and at least one radially extending portion pivotally connected to the housing. The extending portion is rotatable from a retracted position to an extended position to engage the rim. Additionally, urging the extending portion toward the extended position with a biasing member.

From the foregoing disclosure and the following more detailed description of various preferred embodiments, it will be apparent to those skilled in the art that the present invention provides a significant advance in the technology and art of spare tire handling assemblies. Particularly significant in this regard is the potential the invention affords for providing a high quality, reliable, and a low cost universal tire handling assembly. Additional features and advantages of various preferred embodiments will be better understood in view of the detailed description provide below.

BRIEF DESCRIPTION OF THE DRAWINGS

These and further features of the present invention will be apparent with reference to the following description and drawing, wherein:

FIG. 5 is a partial sectional view of the spare tire and the extension portions of the spare tire device partially rotated from the extended position to the retracted position;

FIG. 6 is a partial sectional view of the spare tire and the spare tire device in an extended position;

Figure 1:
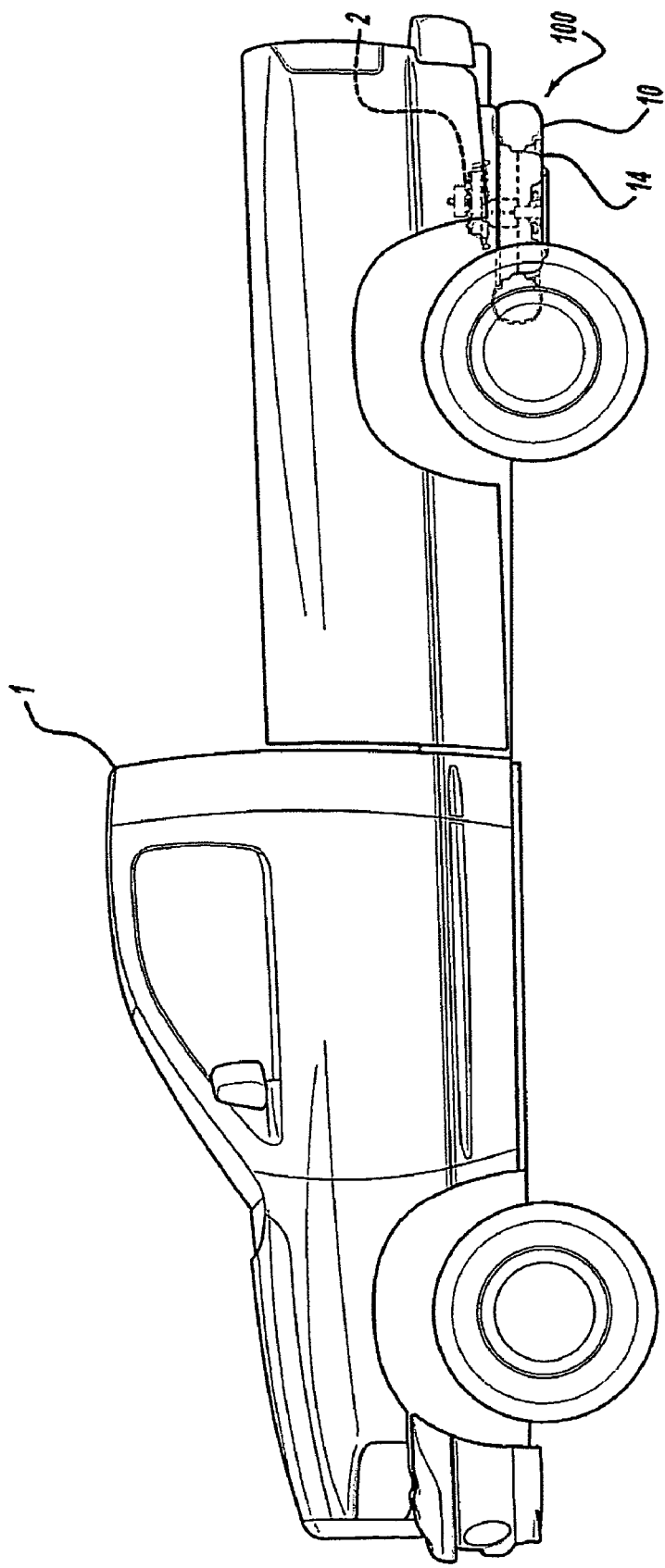
FIG. 1 is a side view of a motor vehicle with a spare tire device according to the invention.

It should be understood that the appended drawings are not necessarily to scale, presenting a somewhat simplified representation of various features illustrative of the basic principles of the invention. The specific design features of the spare tire handling assembly as disclosed herein, including, for example, specific dimensions will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refers to the orientation of the spare tire assembly illustrated in the drawings. In general, up, or upward or above refers to an upward direction within the plane of FIGS. 1–12 and down, or downward or below refers to a downward direction within the plane of FIGS. 1–12.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved spare tire handling assembly for use with a vehicle, which includes both powered or non-powered rubber tire conveyances. Powered vehicles include automobiles, trucks, sport utility, busses, recreation vehicles, industrial equipment and the like, construction equipment and the like, off road vehicles such as dune buggies, golf carts and the like, and air borne vehicles. Non-powered vehicles include a trailer, a wagon and other types of towed vehicles, will be apparent to those skilled in the art given the benefit of this disclosure. The present invention can be utilized with any vehicle having a spare tire stored in the vehicle. Other embodiments employing the teachings of the present invention may be suitable for other mobile applications, such as rubber tired trains and the like.

Figure 2:
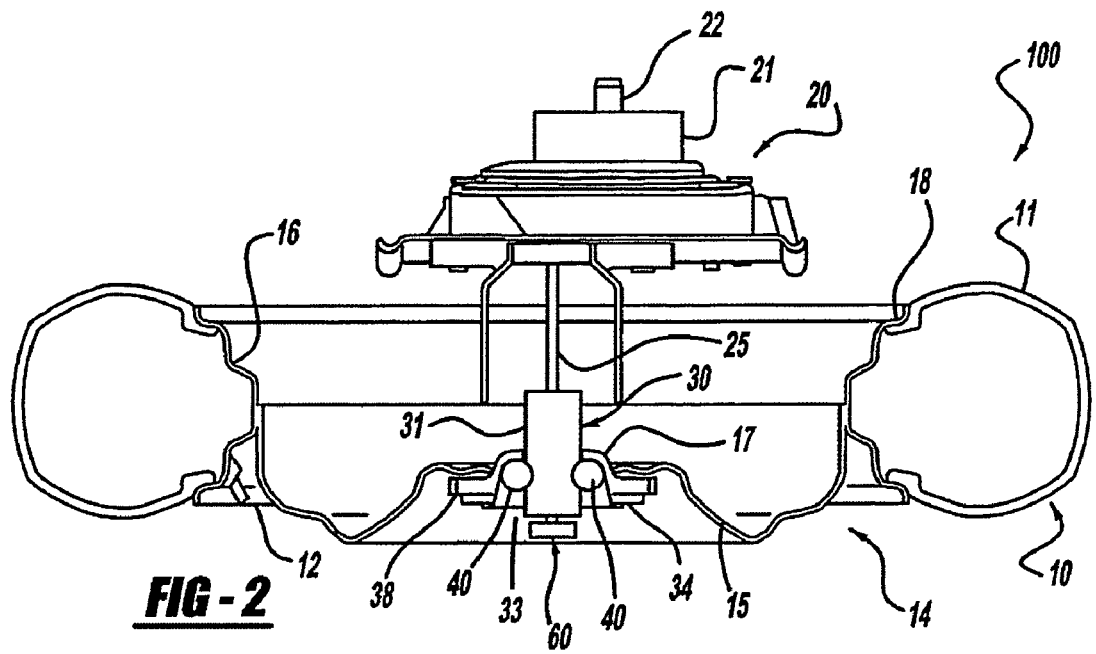
FIG. 2 is a partial sectional view of the spare tire and the spare tire device.
Figure 4:
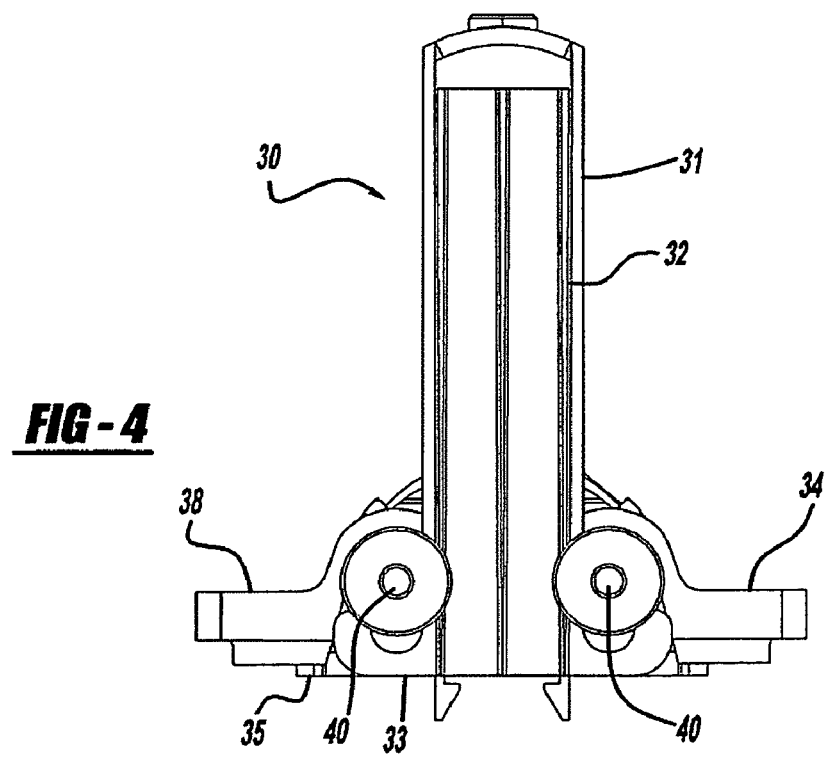
FIG. 4 is a side view of the wheel retainer.

Referring now to the drawings, FIG. 1 shows a spare tire handling device according to the present invention and designated by the numeral 100. The device 100 is mounted to a vehicle 1 with a support member 2 that is conventionally fastened thereto. The device 100 is adapted for moving a spare tire 10 relative to the vehicle 1. As best shown in FIG. 2, the spare tire has a tire 11 with a valve stem 12. The tire 11 is mounted on a rim 14 as is conventional. The rim 14 has a web portion 15, a rim portion 16 and a through hole 17. The rim portion 16 has a recessed portion 18 spaced away from web portion 15.

Device 100 includes a winch 20, flexible member 25, a wheel retainer 30 and a swivel or stop member 60. Winch 20 includes a drum 21 and actuation mechanism 22 which is manually operated as disclosed in U.S. Pat. No. 6,267,546 which is owned by the assignee of the present application, the disclosure of which is incorporated in its entirety herein. Optionally, the actuation mechanism is actuated by a hydraulic, electrical or pneumatic motor, each of which is suitably connected to power sources in a known manner and controlled by conventional controllers, switches and the like. The illustrated drum is suitably mounted to the vehicle by conventional fasteners for rotation by actuation mechanism 22 and is adapted to wind and unwind a flexible member 25 thereon upon rotation of the drum. The flexible member 25 includes a cable, rope, chain, cord or the like, which is wound onto and off the drum. It should be noted that suitable torque limiters, gear reduction devices and the like could be provided in a known manner. Any suitable winch or actuation mechanism can be utilized within the scope of the present invention and also that the drum can be oriented in a horizontal plan or in a vertical plane. The flexible member has a first or upper end secured to the drum and a second or lower end extending from the drum to the wheel retainer 30 that is adapted to support the spare tire. The wheel retainer 30 is raised and lowered as the flexible member is wound and unwound and unwound around the drum respectively.

Figure 3:
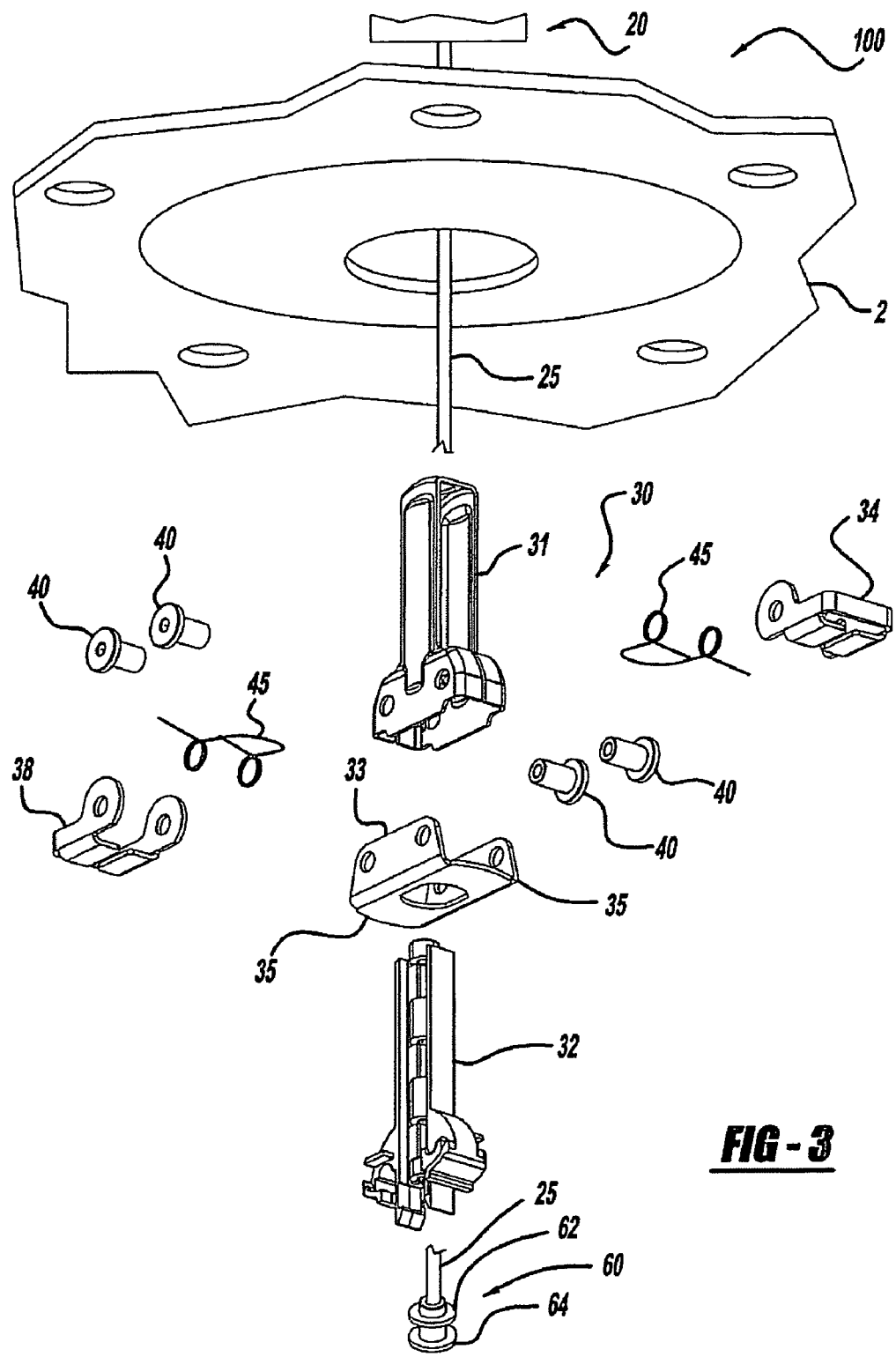
FIG. 3 is an exploded view of the wheel retainer according to the invention.

As shown in FIG. 3, the illustrated wheel retainer 30 includes a housing 32, a first extending portion 34, a second extending portion 38, a pivot pin 40 and a biasing member 45. The housing 32 is shown as an elongate member with a vertically extending passage from a top end to a bottom end for the passage of the flexible member from the drum swivel 42 that is attached near the lower end of the flexible member. Those skilled in the art will recognize that the housing may take any shape suitable for practicing the invention and need not be as illustrated but as dictated by the specific geometric restraints of each application and may optionally include a cover 31. The near the bottom end of the housing, a pair of adjacent but spaced apart laterally extending apertures are formed. Into each aperture, pivot pin or rivet 40 is disposed so that one pin rotatably connects first extending portion 34 to the housing 32 and another pivot pin 40 connects the second extending portion 38 to the housing. While the illustrated housing describes first and second extending portions, optionally, one extending portion may be used in practicing the present invention. The pivot pin 40 is illustrated as a two piece interlocking pin. Optionally, a unitary pivot pin may be used in practicing the invention. The saddle member 33 is attached to housing 32 by means of pivot pins 40. The illustrated saddle member has a flat planar portion with an aperture and a pair of extension sections that are substantially perpendicular to the surface of the planar portion. Each of the pair of extensions has a hole that is aligned relative to the other hole in the other extension section. Pivot pins 40 are inserted through the holes in each of the extension sections and extend axially on each end to connect saddle member 33 to housing 32. Each saddle member extension section guides the extension portion during the rotational movement of the extension portion relative to housing 32 and the planar portion provides a rotational stop 35 that prevents the over-rotation of extension portion from its retracted position to its extended position. The illustrated saddle member has four holes, of which two central holes aligned with two corresponding opposite holes in the other extension section when both extension portions are used in practicing the invention and the saddle acts as a stop for both extension portions to prevent over-rotation from the retracted position to the extended position. The first extending portion is biased by one biasing member 45 from a retracted position in FIG. 5 to an extended position in FIG. 6. The illustrated biasing member 45 is a U-shaped torsion spring with a body portion and two leg portions. Each leg has two sections. One section extends from the body portion to press against the planar portion of the saddle and the other section is wrapped around an axially extending end of the pivot pin between the housing and the saddle. The body portion presses against the planar portion of the extending portion to urge the extending portion toward an extending position. Optionally, the biasing member has a body portion that is positioned adjacent the pin and a pair of extending ends. One end extends into a notch or aperture in a web of the first extended or extending portion 34 and the other end fits into a notch or aperture in housing 32. Similarly, the second extended or extending portion 38 is biased by another biasing member from its retracted position to its extended position. The biasing members torsionally urge each respective extending portion 34, 38 from a retracted position toward an extended position.

Figure 8:
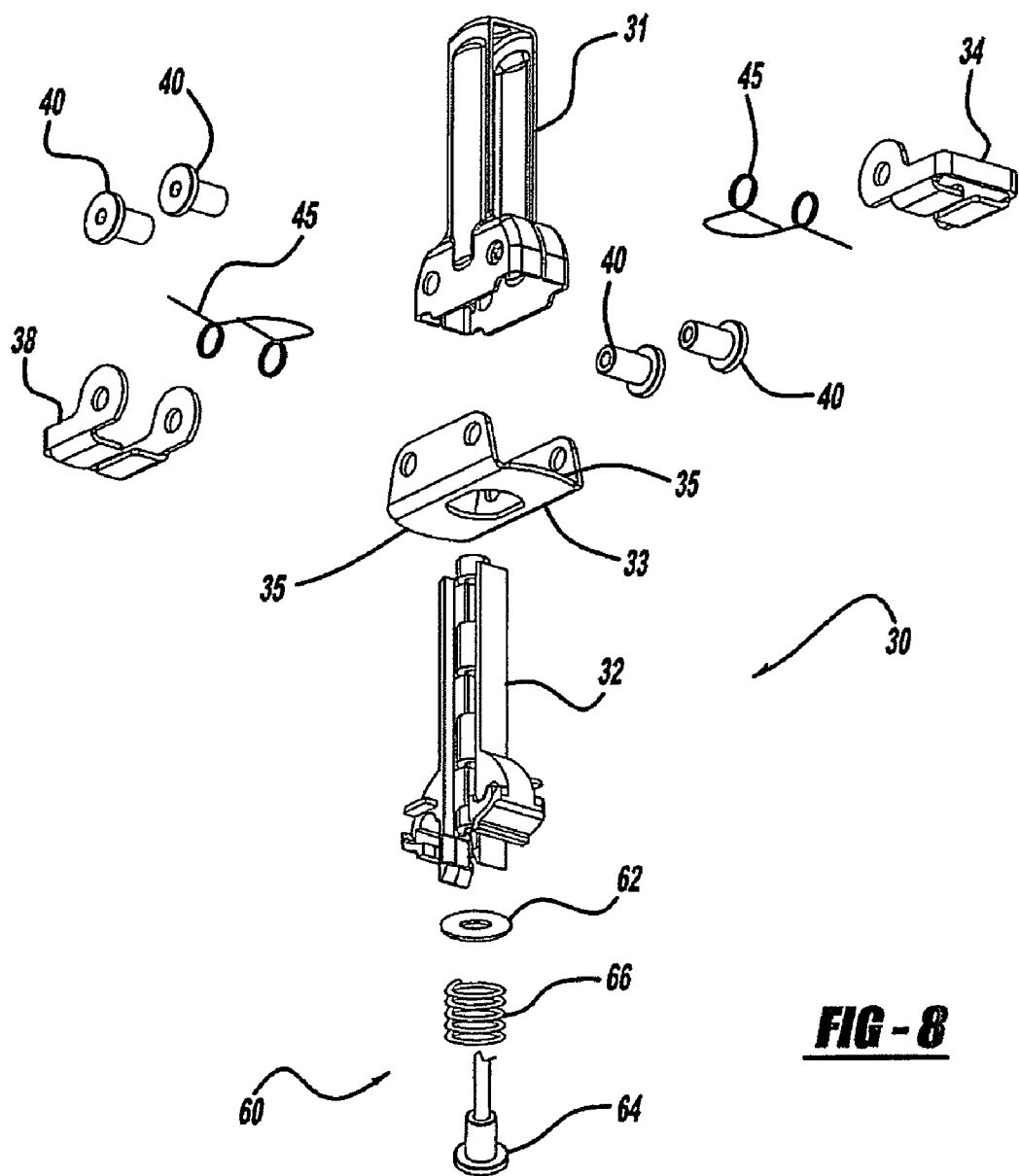
FIG. 8 is an exploded view of the spare tire device with an optional biasing member.

Stop member 60 includes a flange 62 with an aperture and an end portion 64 that is attached to flexible member 25 by conventional means. The flange 62 is slidably mounted through the aperture on the flexible member. The end portion 64 provides a fixed position for the flange to abut against. Optionally, as shown in FIG. 8 stop member 60 includes a biasing member 66 that is disposed about the flexible member 25. The illustrated biasing member 66 is a coil spring disposed around the flexible member and abuting flange 62 and flange in end portion 64. The flange is positioned near the bottom end of housing 32 to support the housing when the device is moved from the accessing position to the stored position. Optionally, housing 32 has a counterbore centrally located with the vertically extending passage. The counterbore forms a seat in the housing to permit flange 62 and a portion of biasing member 66 to be disposed in the counterbore. Biasing member 66 may extend out of the passage in the housing. Biasing member 66 urges the wheel retainer in an upward direction from flange 62 to urge the retainer away from flange 62. Optionally, biasing member is a polymeric member such as microcellurlar polyurethane or a foamed elastomer such as nitilre, polyacrylate, natural rubber, silicone or the like. The biasing member has a second function; that is, to absorb any reactive forces exerted on the device 100 by road conditions, such as potholes and the like.

The first and second extending portions are identical and only the first extending portion will be described in detail. The illustrated portion 34 is formed with a longitudinal portion and a lateral portion. The longitudinal portion extends from the pivot end to a free end. The free end may take on many forms, including curved, blunt and rounded depending on the application requirements and constraints. The lateral portion has a body section that can have many forms including flat planar, U-shaped, planar with reinforcement, sinusoidal, arcuate or the like. Those skilled on the art will recognize that the extending portions 34, 38 respectively, may take on any other form consistent with the teachings of the invention.

Figure 7:
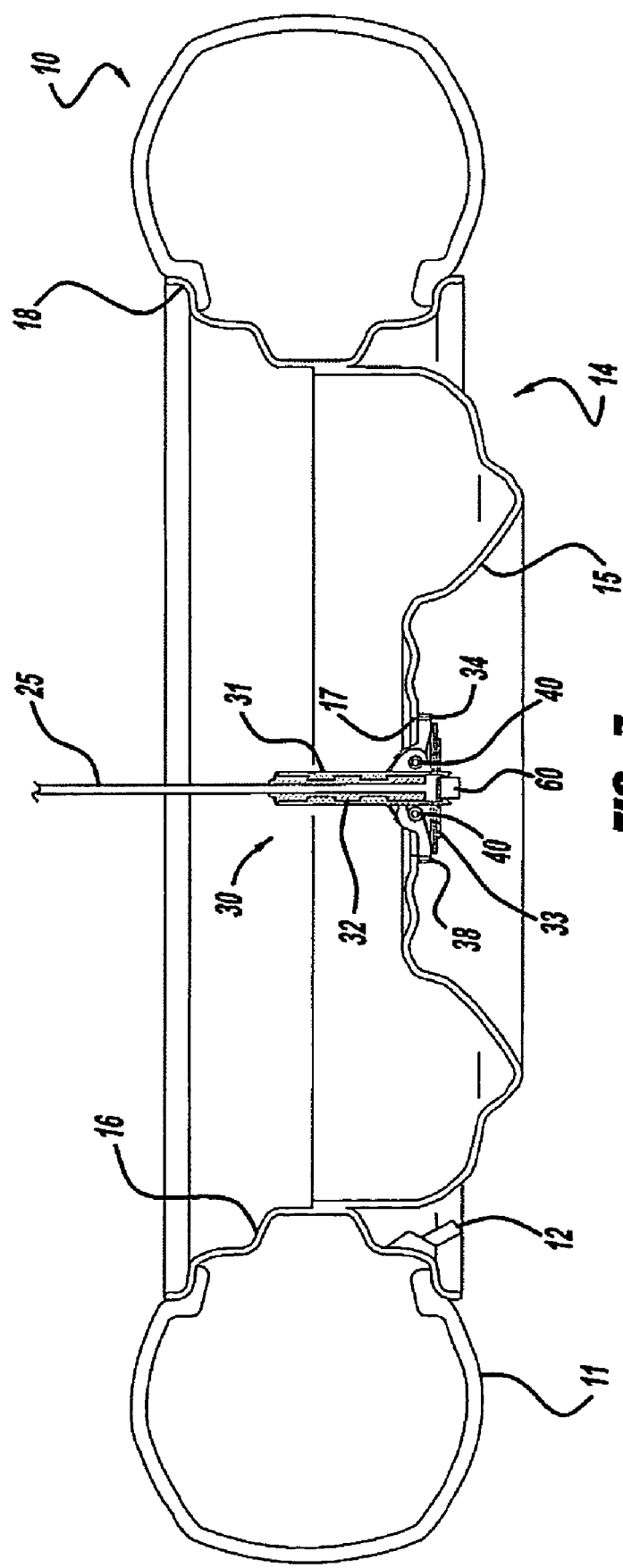
FIG. 7 is a partial sectional view of the spare tire and the spare tire device engaging the rim portion.

During normal operation of the vehicle, the spare tire is secured in a storing position as is conventional (FIG. 1). When it is desired to lower the spare tire from its storing position to its accessing position, the operator operates the winch in a conventional manner by unwinding the flexible member from the drum until the tire rests on the ground or a support surface and the flexible member is slack. The operator then grasps the first extended portion 34 or the second portion 38 or optionally, both portions and rotates each portion about their respective pivot pins from an extended position to a retracted position. With one portion or both portions in the retracted position (FIG. 5), the operator passes housing 32 through hole 17 in the rim 14 and above or away from the rim to release the tire from the device 100 (FIG. 6). After the tire is no longer connected to the device 100, the operator releases one portion or both portions 34, 38 respectively. As this occurs, each biasing member urges each of the extension portions to its extended position. When the operator desires to store a tire in the vehicle, the operator orients the tire on the ground or support in proper orientation relative to the vehicle and grasps the housing and presses one or both of the extension portions 34, 38 respectively, each of which is in the extended position, against the web in the rim. As the operator continues to press one of the extension portions or both extension portions against the web, the force in one or all of the biasing members is overcome by the force exerted on the housing by the operator and one of the extended portions or both extension portions 34, 38 respectively rotate about pivot pin 40 to the retracted position. This allows housing 33 to pass through the aperture in rim 14. Once one or both of the extended portions pass through the aperture, the biasing member urges each of the extended portions to an extended position. The operator operates the winch in the conventional manner to wind the flexible member around the drum. As this occurs, the body section of each extension portion 34, 38 respectively, each of which is in the extended position, engages the undersurface of the web of the tire rim (FIG. 7). Those skilled in the art will appreciate that when the extended portions 34, 38 respectively, are in their extended positions, the extended portions 34, 38 form a overall length (from free end to free end) that is greater than the diameter in the aperture in the rim 14. Optionally, where only one extension portion is used, the housing and extension portion form an overall length that is greater than the passage in the aperture. Device 100 cannot pass through the aperture in the rim without the extended portion rotating from its normally extended position to a retracted position. With further operation of the winch, the flexible member is wound around the drum and the tire is raised from the ground or support, that is from the accessing position and to the stored position in the conventional manner. As the tire continues to move from the ground toward the stored position, the flange 62 supports the weight of the housing. The weight of the housing acting on the flange 62 forms a reactive force that acts on the lower cam surface of the lock arms to urge the lock arm toward the open position. As the tire approaches the stored position, the tire abuts against the support in the vehicle and the winch can no longer wrap the flexible member around the drum and any further upward movement of the tire is prevented. Optionally, biasing member 66, which is between the flange 62 and the flange portion of end portion 64 absorbs the flexible member due to road conditions and urges housing 32 away from flange 62 (FIG. 8).

Figure 9:
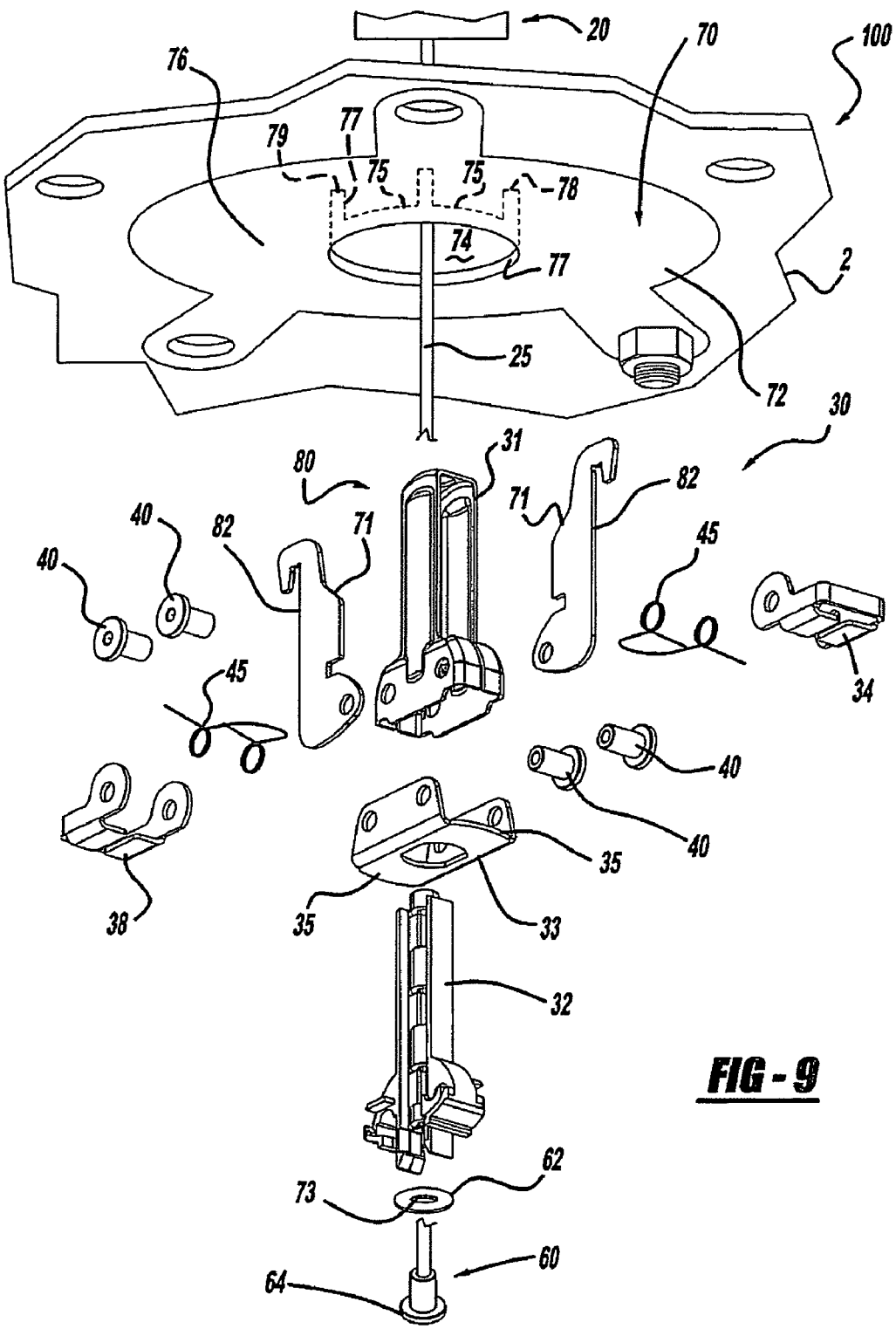
FIG. 9 is an exploded view of the spare tire device with an optional secondary lock.

Further optionally, device 100 includes a lock bracket 70 and a secondary lock device 80 as shown in FIG. 9. The illustrated secondary lock is as described in U.S. patent application Ser. No. 10/127,298, owned by the assignee of the present invention and the disclosure of which is incorporated herein by reference. Any suitable secondary lock can be used within the scope of the present invention, such as for example, as is described in U.S. Pat. No. 6,427,981 and U.S. Pat. No. 6,267,546, which is owned by the assignee of the present invention and the disclosure of which is incorporated herein by reference. The illustrated lock bracket 70 is attached to the vehicle by conventional fastening means. Lock bracket 70 has a support portion 72 and extends radially and longitudinally from the support portion to form a cavity 74 with sidewalls 75 and a base 76. The base 76 has an aperture 77 with a lip 78 to form a support edge 79. The secondary lock 80 includes a pair of lock arms 82 that are each pivotally attached to housing 32 and a cable guide member 86. The housing has a pair of elongate opposite cavities that permit the lock arms to move in and out of the housing. Each of the lock arms is pivotally mounted to the housing and each arm includes a cam surface and a lower cam surface 73. The lower cam surface extends below the end of the housing. When the tire and housing are moved toward to the stored position, the weight of the housing acts on the flange 62 and develops into a force that is transmitted to the lower cam surfaces of the lock arms. The lower cam surface is contoured and when it abuts against flange 62 the lock arms are urged to an unlocked position. Optionally, the biasing member 66 acts on flange 62 and, in addition to the weight of the housing, the biasing member 66 forms a biasing force on the lower cam surface so that the lock arms are urged to an unlocked position. As the device 100 continues to move toward the support 72 and the stored position, each cam surface 71 of the lock arms engages the lock bracket so that each of the lock arms are caused to pivot from the unlocked position to the locked position in order to pass through aperture 77 and into cavity 74. In the locked position, when the flexible member breaks, each of the lock arms drop to engage lip 78 of lock bracket 70 to prevent the tire from disengaging from vehicle 1.

Figure 10:
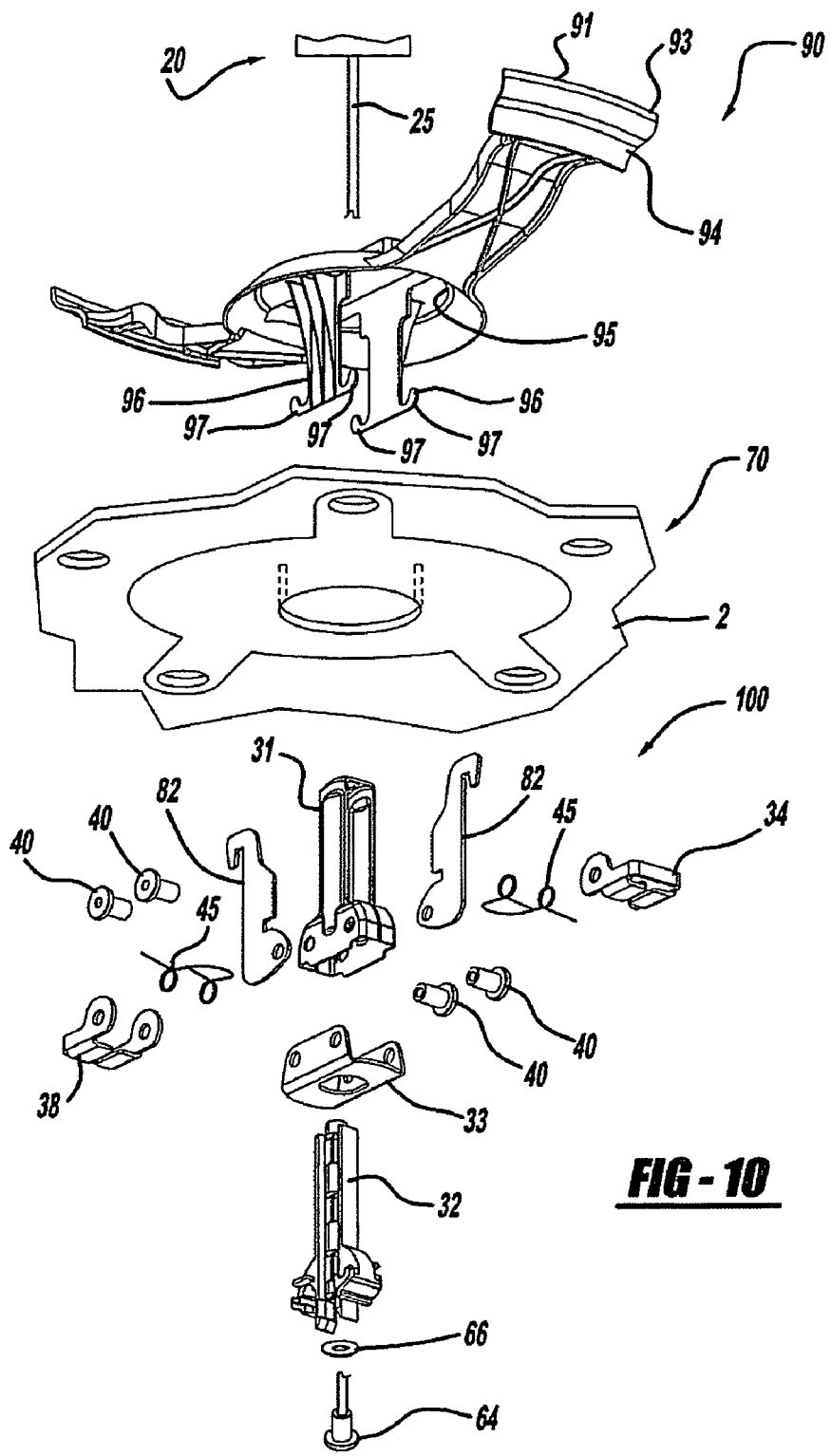
FIG. 10 is an exploded view of the spare tire device with an optional rim spacer.
Figure 11:
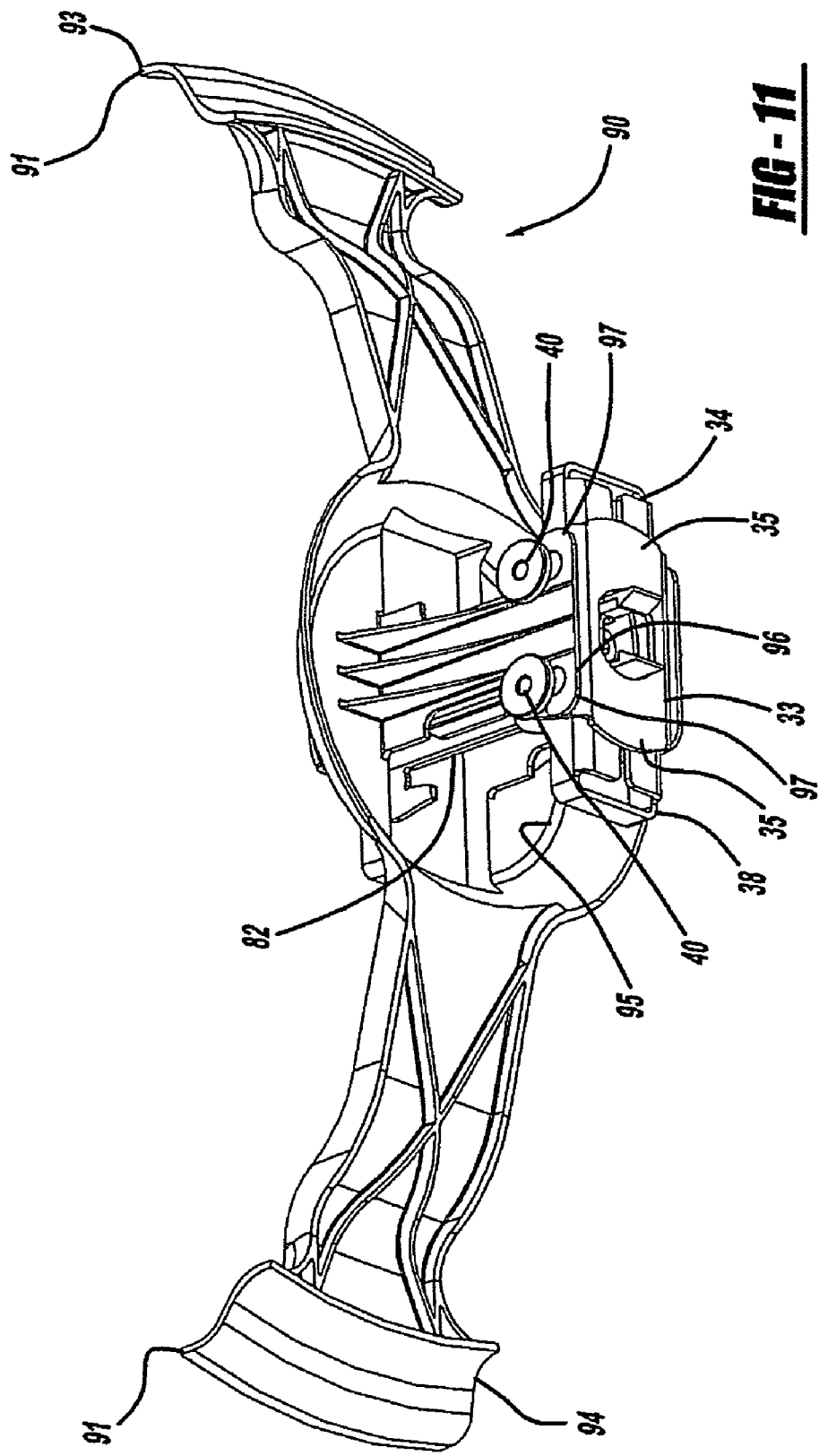
FIG. 11 is a perspective view of the rim spacer.
Figure 12:
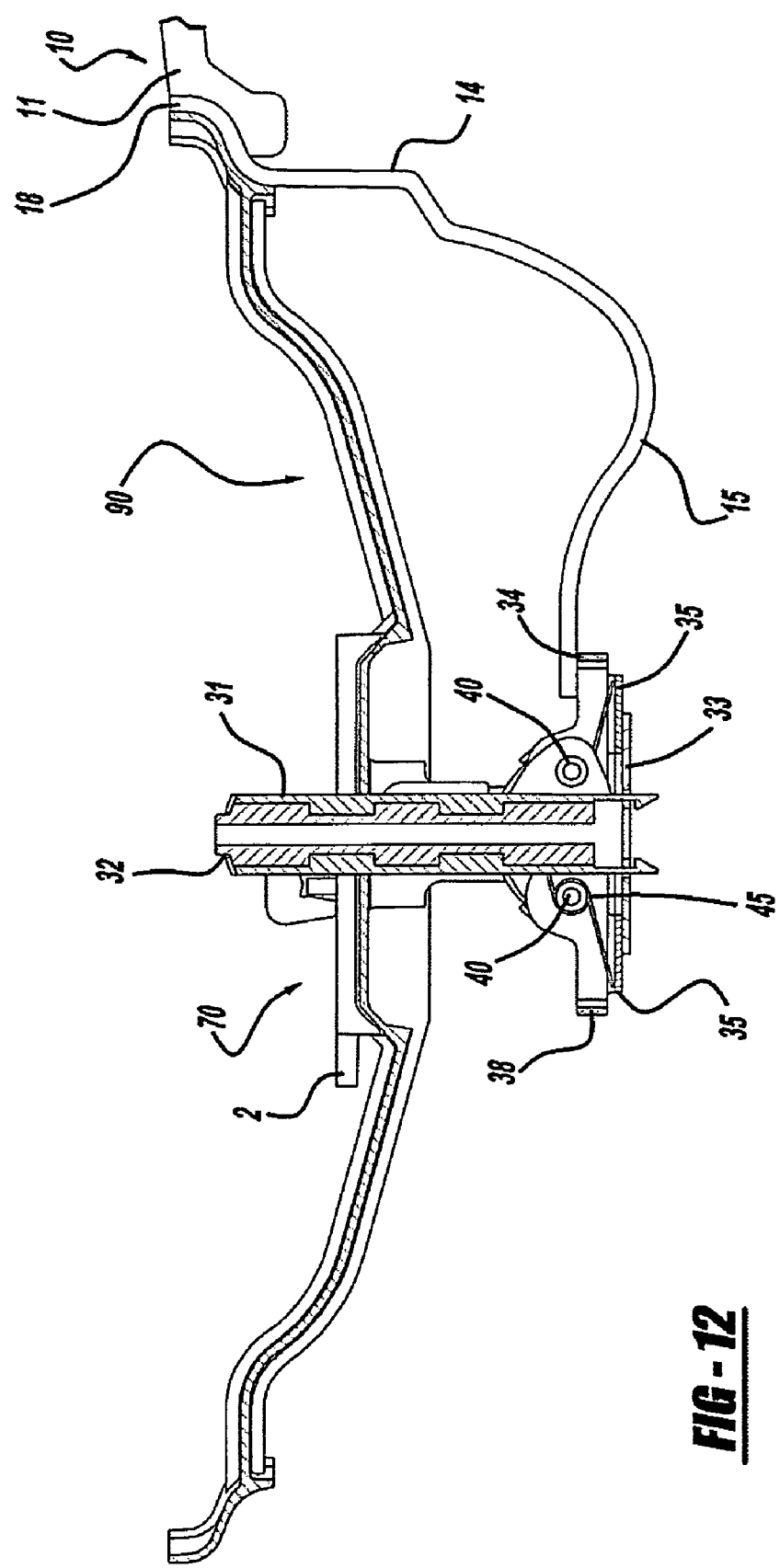
FIG. 12 is a partial sectional view of the rim spacer, tire and spare tire device with the cover removed for clarity sake.

As shown in FIGS. 10–12, optionally, a rim spacer 90 is used with device 100 to orient the tire and tire rim relative to the vehicle 1. The illustrated rim spacer 90 has a radially extending portion and a central hole 95. The outer rim portion 91 extends radially along a web portion from the central hole. The outer rim portion 91 has an outer diameter 93 and an axially and radially extending inner rim 94 portion adjacent the outer rim portion 91. The outer rim 91 and inner rim 94 portions nest within the recessed portion 18 of the tire rim 14 to aid in the orientation of the tire relative to the spare tire handling device 100. Those skilled in the art will appreciate that the rim spacer need not be one piece but can be segmented into several portions that are suitably fastened together or formed into a unitary or multipiece member. Around the central hole 95, a pair of axially extending stops 96 are formed or attached to the web portion. Each stop has a pair of hook shaped extensions 97 adapted to engage the pivot pins from the first or second extending portions and limit the axial movement of the device 100 into the hole 95 and into the hole in the rim of the tire. In the event that the operator does not orient the tire properly prior to engaging device 100 with the tire, the tire rim will not nest in the tire rim. Additionally, the rim spacer assures that the correct sized tire is stored in the vehicle.

The invention as claimed is:

1. A spare tire handling device adapted for moving a spare tire relative to a vehicle, the device comprising, in combination:
   a winch apparatus;
   a flexible member having one end attached to the winch and the other end detachably engageable with the tire, the tire being displaceable from an accessible position to a stored position in response to the rotation of the winch in one direction and from the stored position to the accessible position in response to the rotation of the winch in the opposite direction;
   a wheel retainer member adjacent to the other end of the flexible member, the wheel retainer member having a housing and at least one extending portion being rotatable from a retracted position to an extended position, the housing having a secondary lock assembly and the spare tire having a rim, the rim including a radial web portion axially oriented with respect to a face of the spare tire and including a rim spacer member adjacent the rim, the rim spacer member having a portion forming a hole and an axially extending stand-off portion adjacent the hole, the flexible member being disposed in the hole, the stand-off portion limiting the axial movement of the wheel retainer member into the radial web portion of the rim wherein the at least one extending portion passes through an aperture in the rim when a face of the tire is in one position, and the at least one extending portion is prevented from passing through the aperture when the face of the tire is in another position;
   a stop adjacent the housing, the stop preventing over-rotation of the at least one extending portion beyond the extended position; and a biasing member urging the at least one extending portion toward the extended position.

2. The spare tire handling device as claimed in claim 1 wherein the biasing member is a torsional spring.

3. The spare tire handling device as claimed in claim 1 wherein the at least one extending portion is a pair of opposite extended members.

4. The spare tire handling device as claimed in claim 1 wherein, the wheel retainer member is insertable into the aperture when the at least one extending portion is in the retracted position and being sized greater than the aperture when the extending portion is moved by the biasing member toward the extended position.

5. The spare tire handling device as claimed in claim 1 wherein the at least one extending portion has a hole, and the housing has an opening, and further comprising: a pivot pin disposed in the hole and the opening to connect the extending portion to the housing, the biasing member is adjacent the pivot pin.

6. The spare tire handling device as claimed in claim 1 wherein the biasing member is a torsional spring member having one end adjacent to the housing and the other end adjacent to the extending portion, and further comprising: a pivot pin connecting the extending portion to the housing.

7. The spare tire handling device as claimed in claim 1 wherein the rim portion includes a recess, the rim spacer member having a radial wing portion contacting the recess to orient the rim spacer member in the rim.

8. The spare tire handling device as claimed in claim 1 wherein the rim spacer member is sized to permit a predetermined size of tire to be accommodated by the spare tire handling device.

\* \* \* \* \*